United States Patent
Ng et al.

(10) Patent No.: US 6,565,903 B2
(45) Date of Patent: May 20, 2003

(54) AUTOMATIC HIGH ENERGY SAVING COOKER

(76) Inventors: Andrew Ng, 1/Floor, 84 Po Wah Yen, Yung Shue Man, Lamma Island (HK); Wing Tong Ng, 2B Headland, Shek O (HK)

(*) Notice: Subject to any disclaimer, the term of this patent is extended or adjusted under 35 U.S.C. 154(b) by 0 days.

(21) Appl. No.: 09/905,395

(22) Filed: Jul. 13, 2001

(65) Prior Publication Data

US 2002/0050211 A1 May 2, 2002

Related U.S. Application Data

(62) Division of application No. 09/580,469, filed on May 26, 2000, now Pat. No. 6,283,014.

(51) Int. Cl.⁷ .............................. A23L 1/01; A47J 27/00; H05B 1/02
(52) U.S. Cl. ..................... 426/233; 426/520; 426/523
(58) Field of Search ........................... 99/330, 331, 325; 426/510, 509, 511, 520, 523, 438, 233, 243; 219/439, 440, 438, 430, 431, 621, 625

(56) References Cited

U.S. PATENT DOCUMENTS

| | | | |
|---|---|---|---|
| 3,908,111 A | 9/1975 | Du Bois et al. ............. | 219/442 |
| 4,315,139 A | 2/1982 | Onish et al. ................ | 219/441 |
| 4,421,974 A | 12/1983 | Oota et al. .................. | 219/441 |
| 4,587,405 A | 5/1986 | Andre ......................... | 219/491 |
| 4,591,698 A | 5/1986 | Chang ......................... | 219/400 |
| 5,031,519 A | 7/1991 | Toida et al. .................. | 99/340 |
| 5,048,400 A | 9/1991 | Ueda et al. .................. | 99/332 |
| 5,567,458 A | 10/1996 | Wu ............................. | 426/233 |
| 5,643,485 A | 7/1997 | Potter et al. ................. | 219/621 |
| 5,727,448 A | 3/1998 | Sa ............................... | 99/331 |
| 5,839,357 A | 11/1998 | Ha et al. ...................... | 99/337 |
| 6,019,029 A | 2/2000 | Chan ........................... | 99/337 |

OTHER PUBLICATIONS

*The New Encylopedia Britannica*, Encylopaedia Britannica, Inc., 15ᵗʰ Edition, vol. 9, pp. 686, 723, and pp. 40 of Special Section, The Coming Millennium.
*Chef's Professional Restaurant Equipment for the Home Chef since 1979*, Late Spring 2000, pp. 57.
www.GoPresto.com,, National Presto Industries, Inc., our history section, Apr. 2000.
*Express Cooking*, Barry Bluestein and Kevin Morrissey, HP Books, Jan. 2000, pp. introduction.

Primary Examiner—Reginald L. Alexander
(74) Attorney, Agent, or Firm—Brian S. Steinberger; Law Offices of Brian S. Steinberger, P.A.

(57) ABSTRACT

A dual-voltage, energy saving, electric pressure cooker is designed with a thermally insulated cooking pot, spaced-apart support members on the bottom of the pot to prevent food from sticking to the bottom, a unique, hinged, saucepan style handle for sealing and unsealing the pot using one hand, a built-in modem that supports the remote operation of manual or preprogrammed cooking controls by telephone or computer. The energy saving is accomplished in a two-mode pressure cooking process. Cooking mode one is active heating or steaming for a short, but controlled period of time, as the liquid inside the pot reaches a temperature of approximately 120° C. (250° F.). Heating is then discontinued and foodstuffs are subsequently cooked to perfection in a second cooking mode wherein latent heat from the first cooking mode completes the cooking process without additional heat being added.

11 Claims, 12 Drawing Sheets

FIGURE 10 – CONTROL OPTIONS

FIGURE 11 - COOK TIME OPTIONS

FIGURE 12 - REMOTE CONTROL

AUTOMATIC HIGH ENERGY SAVING COOKER

This is a Divisional of application Ser. No. 09/580,469 filed May 26, 2000 now U.S. Pat. No. 6,283,014.

This invention relates to pressure cookers, and in particular to electric pressure cookers with an adiabatic cooking mode, capable of being remotely controlled.

BACKGROUND AND PRIOR ART

The principle of cooking foods by steam pressure has been known since 1679 when Denis Papin, A French physicist, invented "The Papin Digester" a saucepan with an airtight lid which incorporated a safety valve, as reported in *The New Encyclopaedia Britannica,* 15th ed., Vol. 9. (1993), page 686. In 1939, the sauce pan-style pressure cooker was introduced by National Presto Industries and became a popular method of preparing food in one third the time while maintaining the vitamin and mineral content of foods and saving both food flavor and color. (Web site: http:\\www.GoPresto.com—April, 2000.)

Many cooks embraced this European invention and used it to turn out meals from one-third to one-tenth the normal time. At the zenith of its popularity, at least one pressure cooker could be found in most well-equipped kitchens. However, with the advent of fast food restaurants, microwave cookery and some mispreceptions about the safety of the pressure cooker, this valuable utensil experienced a substantial decline in popularity.

In Europe, Japan and Korea, researchers have led the way to the development of today's safe, silent, and sleek stainless-steel cookers, that are relied on for preparation of flavorful. nutritious meals. In Switzerland, for example, the average household owns three pressure cookers, according to Barry Bluestein and Kevin Morrissey, *Express Cooking*, HP Books, 2000, page 1. With the introduction of electric models that you simply program and walk away from, the pressure cooker may now experience a renaissance and move to the forefront of all time-saving devices used to prepare food. See *CHEF'S*; Professional Restaurant Equipment for the Home Chef Since 1979, page 57 of Late Spring 2000 catalog.

Focusing on various cookers that are plugged into electrical outlets for heating purposes, there are features that provide convenience and control to cooking appliances that have not heretofore been found in pressure cookers. For example, U.S. Pat. No. 3,908,111 describes a removable inner receptacle of metal or ceramic material that fits inside a primary vessel with a thermostatic electric heating element connected to the stationery metallic vessel with airspace between the two vessels. The primary vessel is used for high temperature cooking or frying and the inner receptacle is used for slow cooking or simmering. This gives versatility without a focus on saving energy or remote control operation. Likewise, U.S. Pat. No. 4, 591,698 discloses a dual, quick cooking utensil with an outer casing and a movable open inner pot for cooking and baking with a retractable power plug.

Other examples of versatile electric cookers are rice cookers which include U.S. Pat. No. 4,315,139 which discloses a rice cooker with a detachable cooking kettle separated from the heating kettle with a heat insulator having a timed thermo sensor. U. S. Pat. No. 4,421,974 claims an electric rice cooker with an improved timer that uses the "after heat" to continue cooking when the heater is turned off, thus providing a means for conserving energy to effectively convert beta-starch to alpha-starch or "ripening" to produce tasty rice. U. S. Pat. No. 5,727,448 discloses an inner and outer kettle separated by an adiabatic vacuum member which prevents heat from escaping during the cooking process. The energy-conserving configuration is limited to an appliance for cooking rice.

Thermally insulated cooking utensils are disclosed in U.S. Pat. No. 5,031,519 which claims a cooking vessel with a heat-insulating lid; U. S. Pat. No. 5,567,458 has an insulated outer container wherein the insulation can be vacuum or thermal insulation and U.S. Pat. No. 5,643,485 discloses a cooking utensil with a closely spaced-apart controllable vacuum between an inner and outer chamber to activate or inactivate the insulating properties of the pot. Each cooking device has an inner container which is releasably housed in an outer chamber. Neither of these cooking devices has a pressure cooker as the inner chamber.

With regard to electric pressure cookers, U.S. Pat. No. 4,587,405 discloses an electrical heating element with a control circuit that allows preselection of cooking time. U.S. Pat. No. 5,839,357 uses a motor to safely lock both the food container and its lid and has a device for monitoring the inner pressure from the outside. Neither of the aforementioned electric pressure cookers have the novel sauce-pan style handle to safely lock the cooker. Even the traditional sauce-pan style pressure cookers have two handles that require two hands to rotate one handle clockwise and the other handle counterclockwise to seal the cooker. Electric pressure cookers are designed with two handles on the pot lids and two handles on the pot bottoms that are rotated, using two hands, in opposing directions to seal the vessel. Thus, a pressure cooker with a hinged handle that requires only one hand to operate the locking and unlocking means for the vessel would be easier to use, more efficient to operate and less expensive to manufacture. In addition, the present invention advances the art of pressure cooking by providing for remote operation and a means for conserving energy. With the ever-increasing costs of all types of fuel, it would be advantageous to insure that every appliance use the least amount of energy.

Thus, for the increasing numbers of busy, health-conscious consumers who want good nutritious food and don't want to spend hours cooking it, there is a need for a pressure cooker that turns out healthy, low-fat meals safely, in record time with minimal supervision, while conserving energy and at fingertip command, if desired. The present invention provides novel improvements which make the safer, quieter, electric pressure cooker more efficient, more convenient to use and more energy saving.

One unexpected and unobvious result gained by the use of the present invention is the preparation of perfectly cooked foodstuffs while saving energy in a two-mode pressure cooking process. Cooking mode one is active heating or steaming and cooking mode two is allowing the retained heat to complete the cooking process while the pressure cooker returns to ambient conditions.

SUMMARY OF THE INVENTION

The first objective of the present invention is to provide an energy-saving, pressure cooking device that prepares healthy, nutritious foodstuffs, cooked under pressure, with minimal heat loss.

The second objective of this invention is to provide a pressure cooking device that has an adiabatic cooking mode, thus shortening the required heating time.

The third objective of the present invention is to provide a pressure cooking device that is flexible and the cooking time can be remotely controlled by telephone or computer.

The fourth objective of the present invention is to provide a pressure cooking device that can be operated with 120 volts or 240 volts electric power.

The fifth objective of the present invention is to provide a steam cooking device with spaced apart support means or microfeet on the food container bottom to prevent foods from sticking to the bottom.

The sixth objective of the present invention is to provide a pressure cooking device that has a controlled heating time such that foods cannot be over boiled, burned or scorched on the bottom of the pot.

The seventh objective of the present invention is to provide a pressure cooking device that has a single handle that is used for locking and unlocking the cooker.

The eighth objective of the present invention is to provide a pressure cooking device that revitalizes interest in and use of pressure cookers.

The ninth objective of the present invention is to provide a pressure cooking device that encourages a preference for home-cooked meals rather than fast foods.

The tenth objective of the present invention is to provide a pressure cooking device that encourages in-home food preparation.

The eleventh objective of the present invention is to provide a pressure cooking device that is easy to clean.

A preferred embodiment of the pressure cooking device of the present invention comprises having an inner pressure cooker pot permanently housed in an outer pot which is separated from the inner pot by a hermetically-sealed vacuum space or any rigid insulation that has a melting point higher than 600° C. The lid for the inner and outer pot configuration has a hinged handle that seals and locks the cooking device and covers a vent controlled release valve therein. Additional features of the pressure cooking device include an automatic timer for starting and stopping the heating power, a high-pressure safety valve, a removable heat control element causing the appliance to be fully immersible for cleaning, a ridged bottom surface (microfeet) of the cooking pot to prevent sticking, and a two-position 120 volt or 240 volt switch.

Further objectives and advantages of this invention will be apparent from the following detailed description of a presently preferred embodiment which is illustrated in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Generally, a pressure cooker is designed to seal in and control the steam created when the liquid inside the cooker begins to boil. Thus, pressure cookers are constructed of sturdy, durable material, such as stainless steel and heavy gauge aluminum in order to safely withstand high pressures and high temperatures. Pressure cookers also operate within pressure design limits and at temperatures within its heating and cooling capability to affect the properties of food. For example, design pressure limits are usually above ambient pressure, in whole or half atmospheric pressure units. Atmospheric or ambient pressure at sea level is 14.7 pounds per square inch (psi) or approximately 15 psi; therefore, pressure cookers are designed to withstand pressures of 7.5 psi (low pressure) to 15 psi or higher (high pressure). Usually the design limit is 15 psi. above ambient pressure. Operationally, this means that the pressure within a sealed cooker is increased to about 15 pounds greater than the normal pressure at sea level, raising the boiling point of water from 100° C. (212° F.) to 120° C. (250° F.). This enables foods to be cooked in about a third of the normal time, while softening tough fibers and keeping nutrients in tact. The higher the pressure design, the higher the cooking temperature that can be achieved, and the shorter the time required for cooking.

Electric pressure cookers operate almost silently with a minimal loss of steam because they reach and maintain pressure automatically, and if the design pressure is exceeded, the pressure regulator valve automatically vents excess pressure. Some models of electric pressure cookers, including the cooker of the present invention, can be programmed to turn on automatically at a desired hour. A further advantage of the present invention results from the pressure cooker pot being permanently housed in a thermally insulated outer pot. In a first cooking mode, a liquid, usually water, juice or a broth, and ingredients to be cooked are actively heated for a short, but controlled period of time; heating is discontinued and the ingredients are subsequently cooked to perfection in a second cooking mode wherein the latent heat from the first cooking mode completes the cooking process without additional heat being added.

Examples of edible foodstuffs prepared in this manner are pasta, meats, fish, desserts, vegetables, tasty stews, grains, legumes, and soups. Special cookbooks and directions of the pot manufacturer should be followed with care because the cooking process is unique and rapid.

The novel energy saving pressure cooker disclosed in the present invention is connected to an electrical outlet which provides heat to the vessel and also provides power to a modem that allows remote control operation of the cooker.

Figure 1:
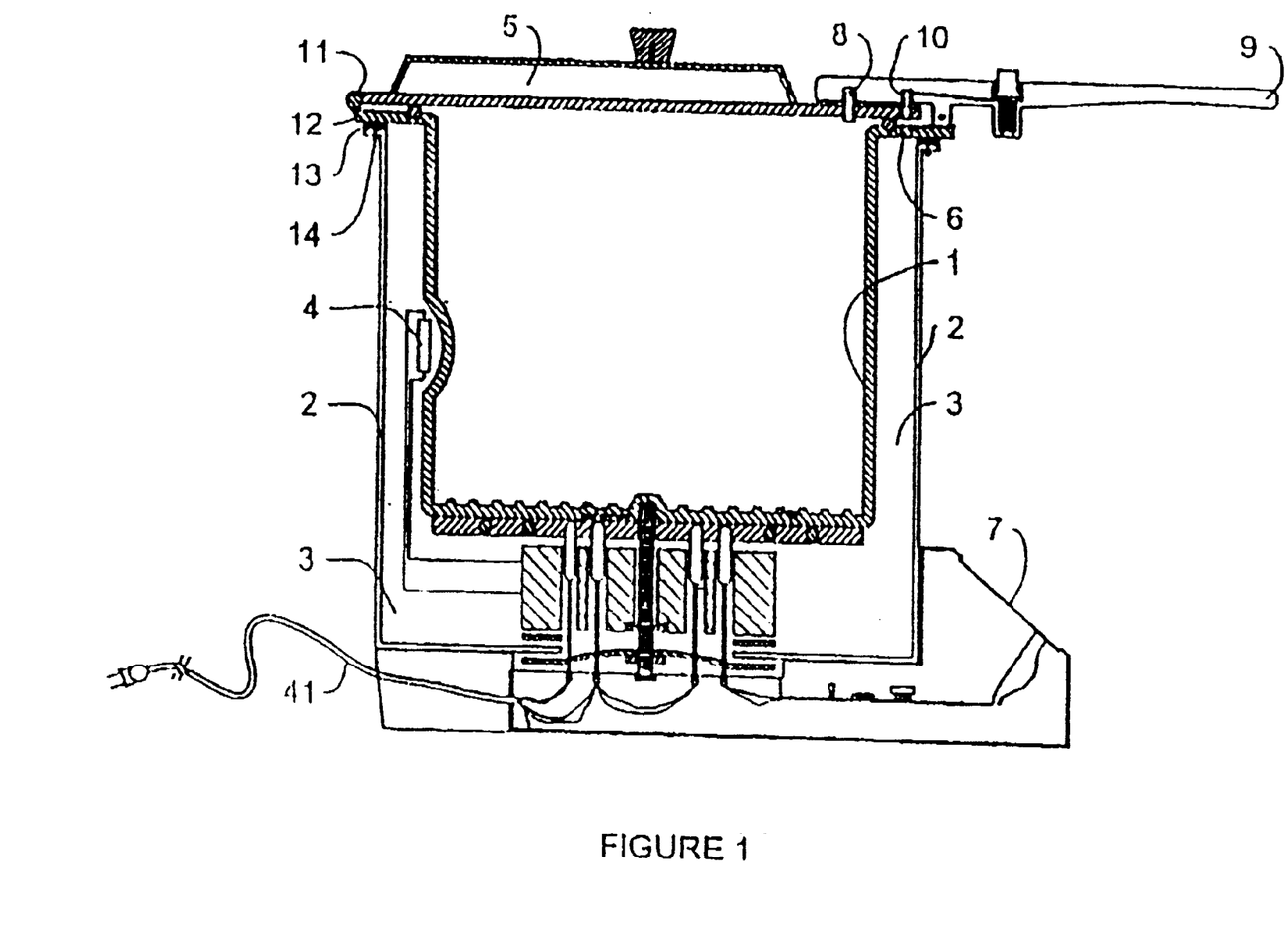
FIG. 1 is a cross-sectional view of the energy saving electric pressure cooker with handle in a locked position and engaged to cover the pressure limiting valve.

FIG. 1 is a cross-sectional view showing an inner pot (1) separated from the outer pot (2) by a vacuum (3). Built into the vacuum space adjacent to the wall of the inner pot is a temperature sensor (4). A pot lid (5) is shown with several means for securing the lid to the pot, such as a hinge (11) connected to a hinge base (12) having a gasket (13) and screw (14) to hold the hinge assembly in place and prevent steam and pressure from escaping the sealed pot. On the opposing side of the pot lid is a handle (9) containing a latch pin (10) and a cover lock (6) to seal and engage the pot in the area attached by the handle. A pressure Limiting valve (8) is covered by a slot in the handle to prevent the involuntary release of pressure. When the handle is completely engaged or locked as shown is FIG. 1, the edges and lid (5) of the pot are joined in an airtight manner. The handle is perpendicular to the side of the pot and has a horizontal orientation in relation to the ground when locked. The timer display (7) and electric wire (41) are shown along the bottom of the pot.

Figure 2:
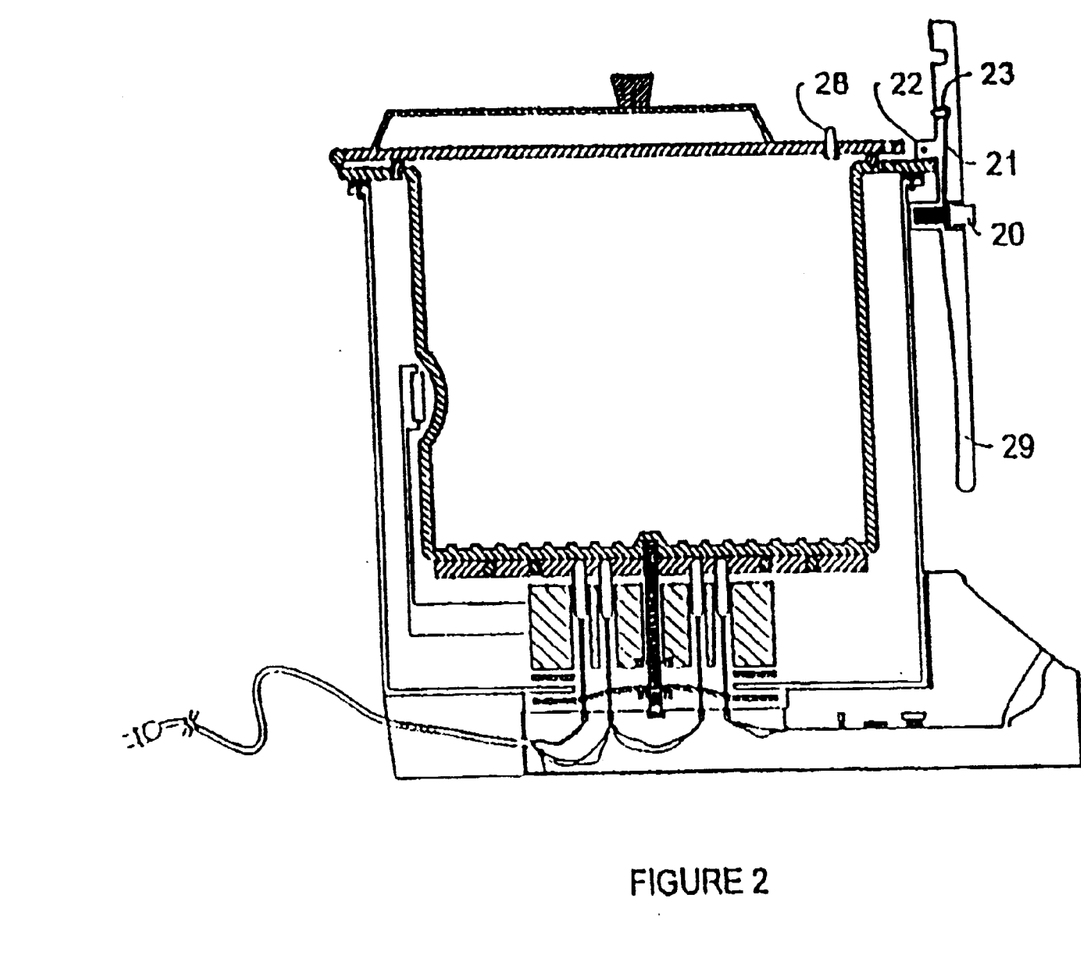
FIG. 2 is a cross-sectional view of the energy savings electric pressure cooker with handle lowered vertically to the side of the pot in an unlocked position.

In FIG. 2, a handle (29) is shown in an open position. Here the handle is parallel to the side of the pot and has a vertical orientation in relation to the ground when unlocked. When the latch release button or switch (20) is engaged, the handle (29) is lowered to the side of the pot by moving the handle on a pivot connection (21) attached to the pot (22). In the process of lowering the handle (29), the latch pin (23) is disengaged from the pot and the pressure limiting valve (28) is also released. The pressure cooker should be at or near ambient conditions when the handle is disengaged or unlocked as shown.

Figure 3:
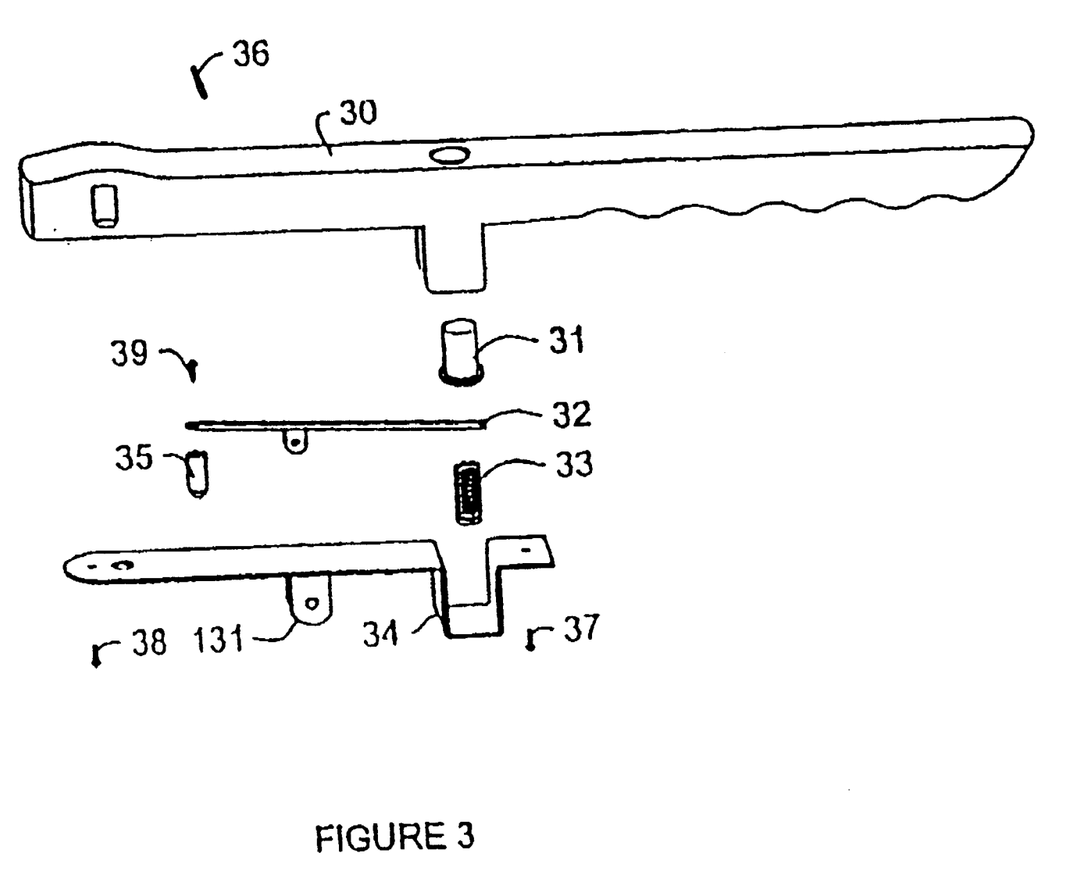
FIG. 3 is an exploded perspective view of the pot handle and various components.

FIG. 3 shows each component of a handle (30) which is attached to the side of the pressure cooker top with a pivot (36). The pivot connection (131) is used to attach the handle (30) to the pot top. A button (31) is used to press a lever (32) which engages the spring (33) that fits within the handle base plate (34). Latch (35) attached to the end of lever (32) locks or unlocks the pot top. All components of the handle (30) are held together with screws (37, 38, 39).

Figure 4:
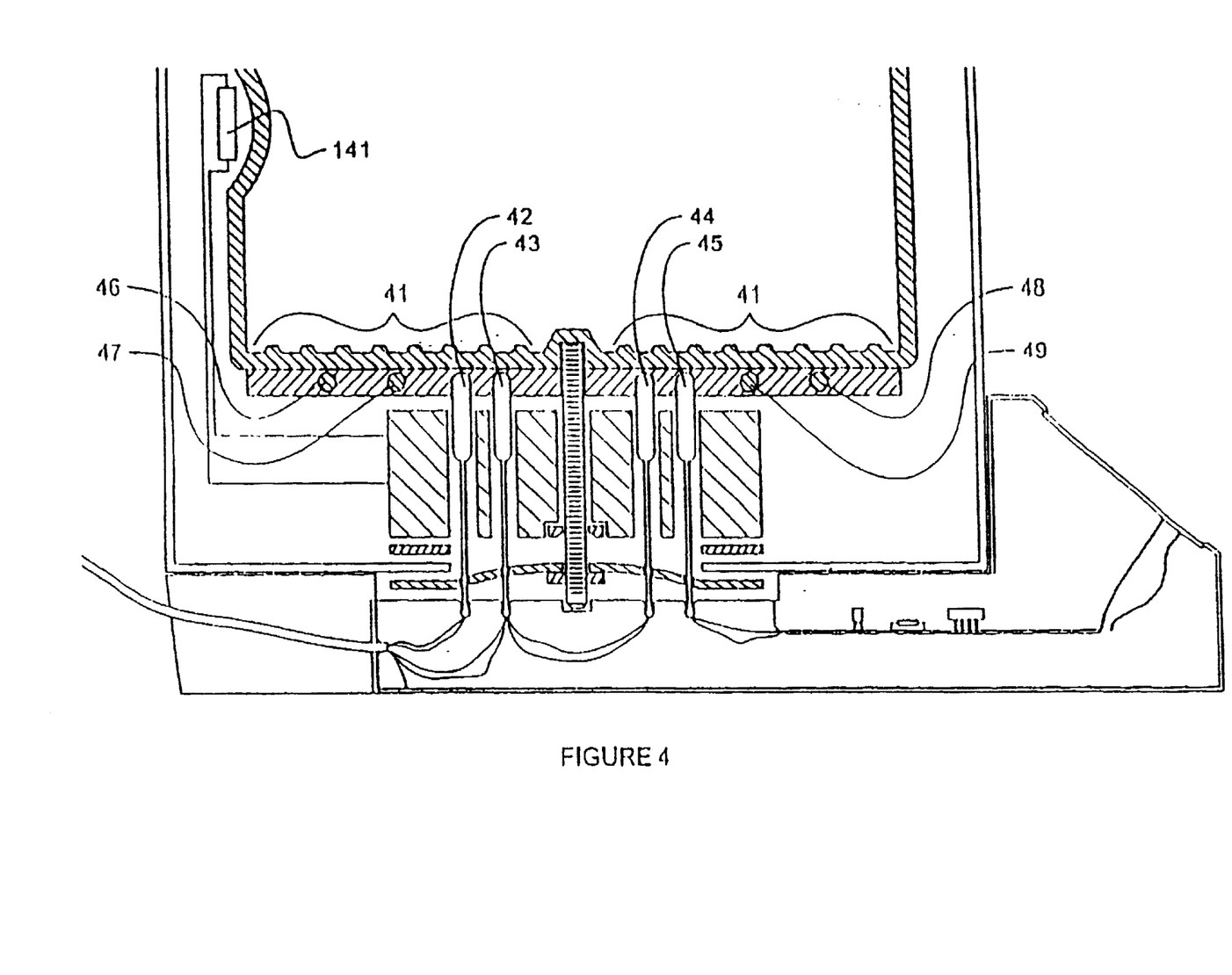
FIG. 4 is a cross-sectional drawing of inner pot bottom and heating, elements.

FIG. 4 provides greater detail of the inner pot bottom and heating elements. A ridged surface, also called "microfeet" (41) functions to keep food from sticking to the bottom. The ridged surface (41) also positions the foodstuff away from the bottom so that food is steamed and not boiled during the cooking process. Steaming preserves nutrients, flavor and color whereas, boiling causes a loss of nutrients, flavor and color. The ridged surface or microfeet (41) are approximately one (1) centimeter above the bottom of the pot Just below and adjacent to the outer bottom wall of the inner pot are electrical heating elements (42, 43, 44, 45) and ceramic heating elements (46, 47, 48, 49). A temperature sensor (141) is connected to the heat insulated ceramic block that supports the electrical heating elements (42, 43, 44, 45) creating a closed loop that facilitates sending and receiving signals to ensure proper operation of the cooker.

Figure 5A:
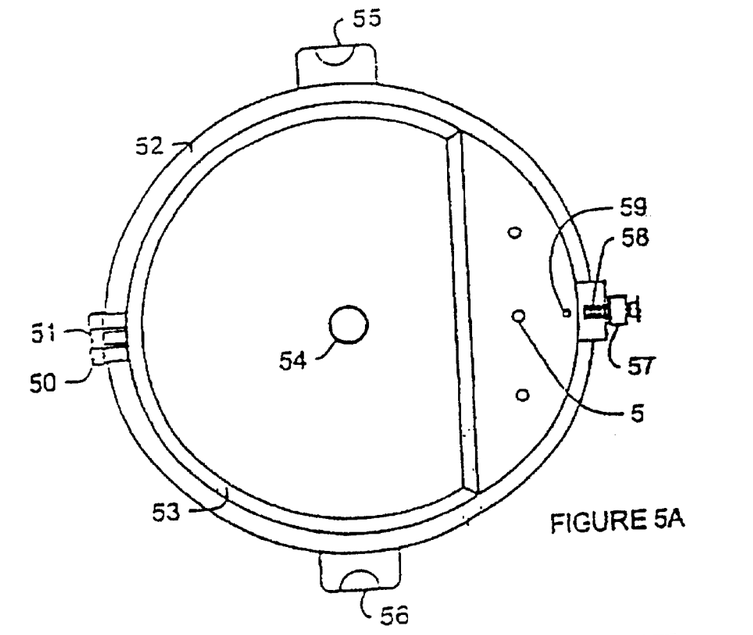
FIG. 5A is a top view of the pot lid.

In FIG. 5A, a pot hinge base (50) cradles a pin-like hinge (51) which is securely attached to the top of the pot. The pot cover (52) supports a smaller pot lid (53) which has a button like knob (54) for conveniently lifting the lid over the food. Grips (55, 56) also provide a convenient means for lifting the entire appliance. From this top view, a handle (57) is shown in a lowered or unlocked position exposing the pivot connection (58), cover lock (59) and the pressure release valve (5).

Figure 5B:
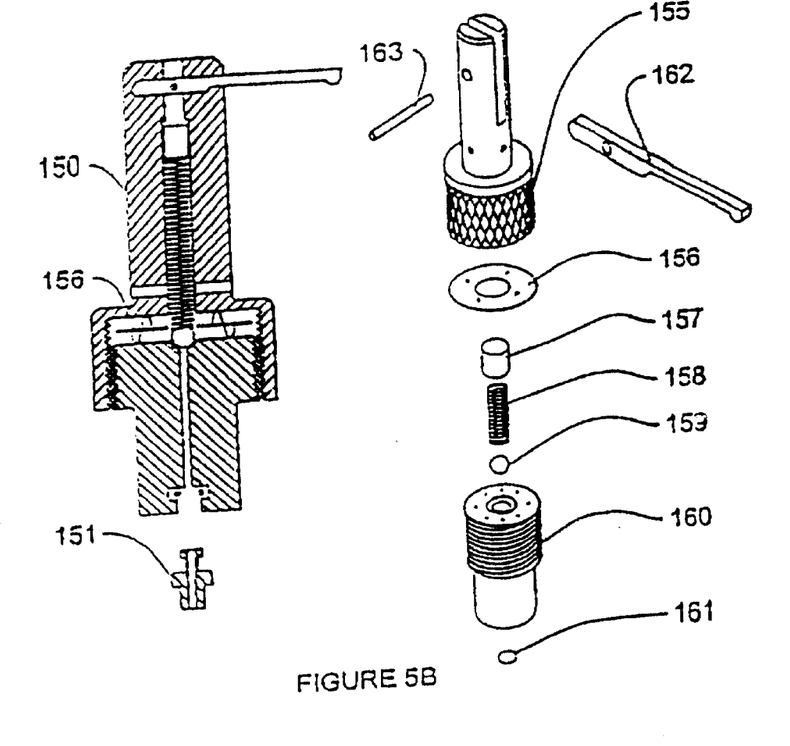
FIG. 5B is a cross-sectional view of the pressure safety valve and an exploded perspective view of various components.

FIG. 5B, shows a cross-sectional view of how the pressure release valve (150) is assembled with a separate depiction of the valve base (151). In the exploded view, a pressure valve (155) is seated over a flat spring washer (156) with a circular space to hold a block (157), spring (158) above a steel ball (159) that rests on a cylinder block (160) having a flat spring (161) on the base of the cylinder block (160). The spring washer (156) has a protruding spring that engages the cylinder block top (160) where higher or lower pressure of the cooking pot can be adjusted. A lever (162) is held in place by a pivot (163). When lever (162) is in a horizontal position, as shown in FIG. 5B, the pressure release valve opens to release the pressure inside the pot to ambient pressure. During cooking, the lever (162) must be in a vertical position to lock in the pressure. Lever (162), when lowered to a horizontal position by steam pressure or manual action, will vent steam into the atmosphere, thereby reducing the pressure within an actively heated inner pressure cooker pot.

Figure 6:
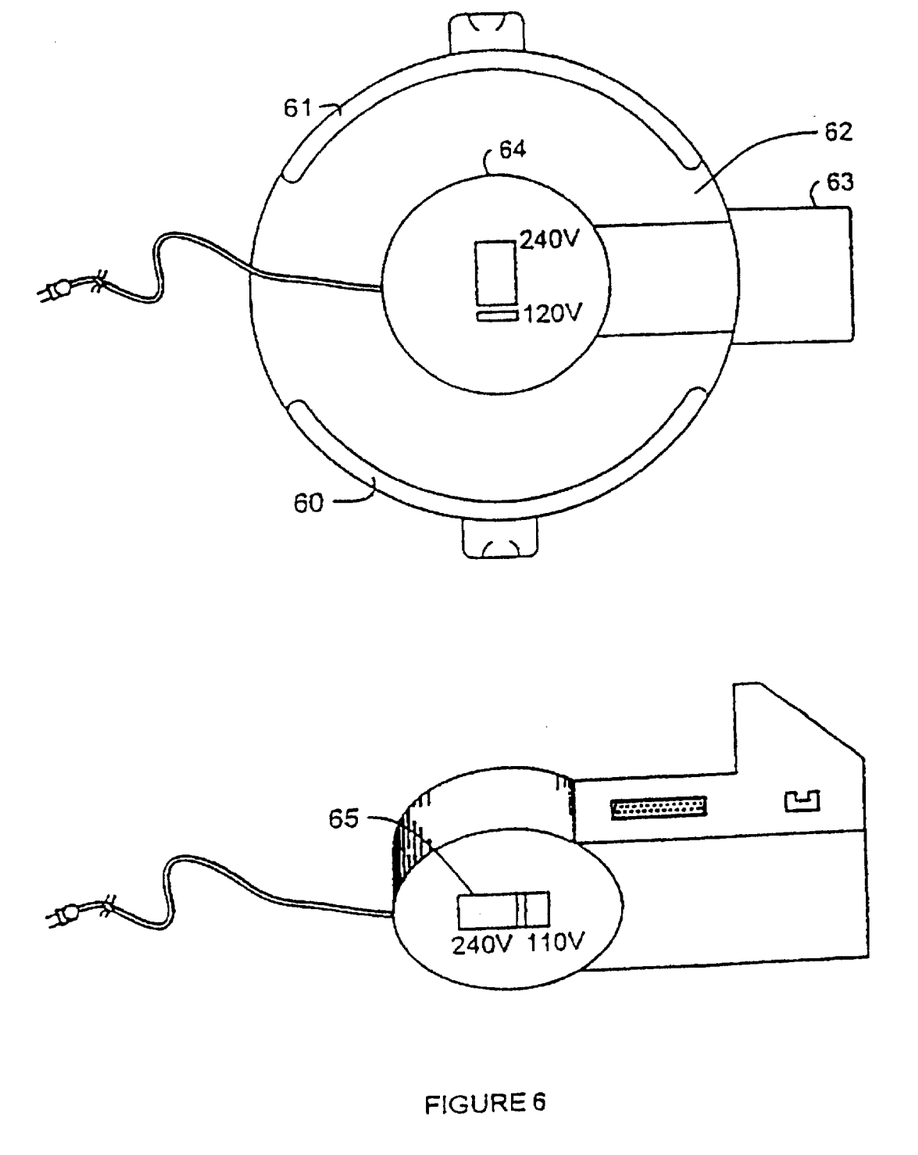
FIG. 6 is a bottom view of the energy saving electric pressure cooker outer pot and a separate drawing of the detachable two-position 120 volt/240 volt switch.

FIG. 6 provides a bottom view of the cooker. A pot base (60, 61) is made of a tough, rigid plastic, such as acrylonitrile-butadiene-styrene (ABS). The base (60,61) supports and hold the outer insulated pot (62) and the casing for the control panel (63). The ceramic block housing (64) is shown with the heating elements adaptable to different heating voltages. The voltage can be switched to operate at 120 volts in the United States, or 240 volts in Europe and Asia. The means for selecting the desired voltage is shown in a switch (65).

Figure 7:
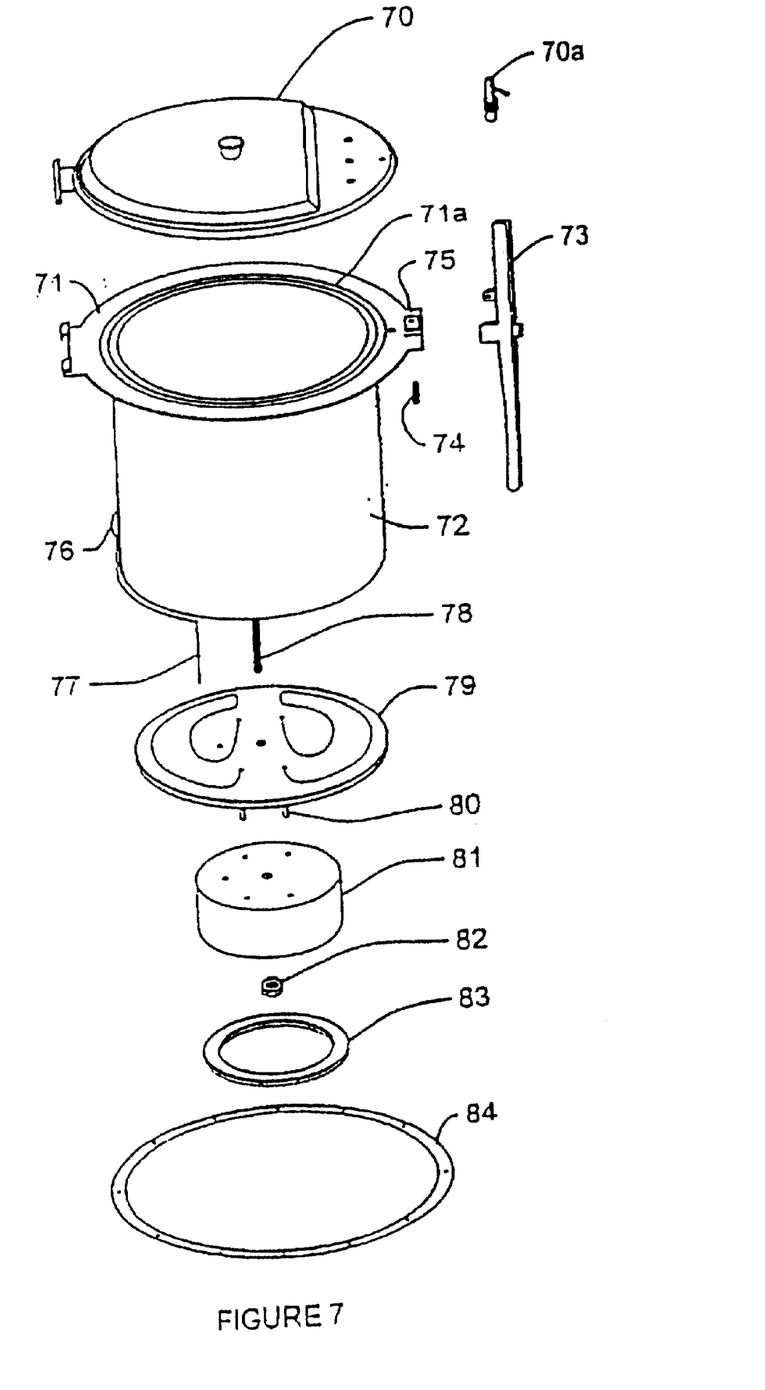
FIG. 7 is an exploded perspective view of the inner pressure cooker pot assembly.
Figure 8:
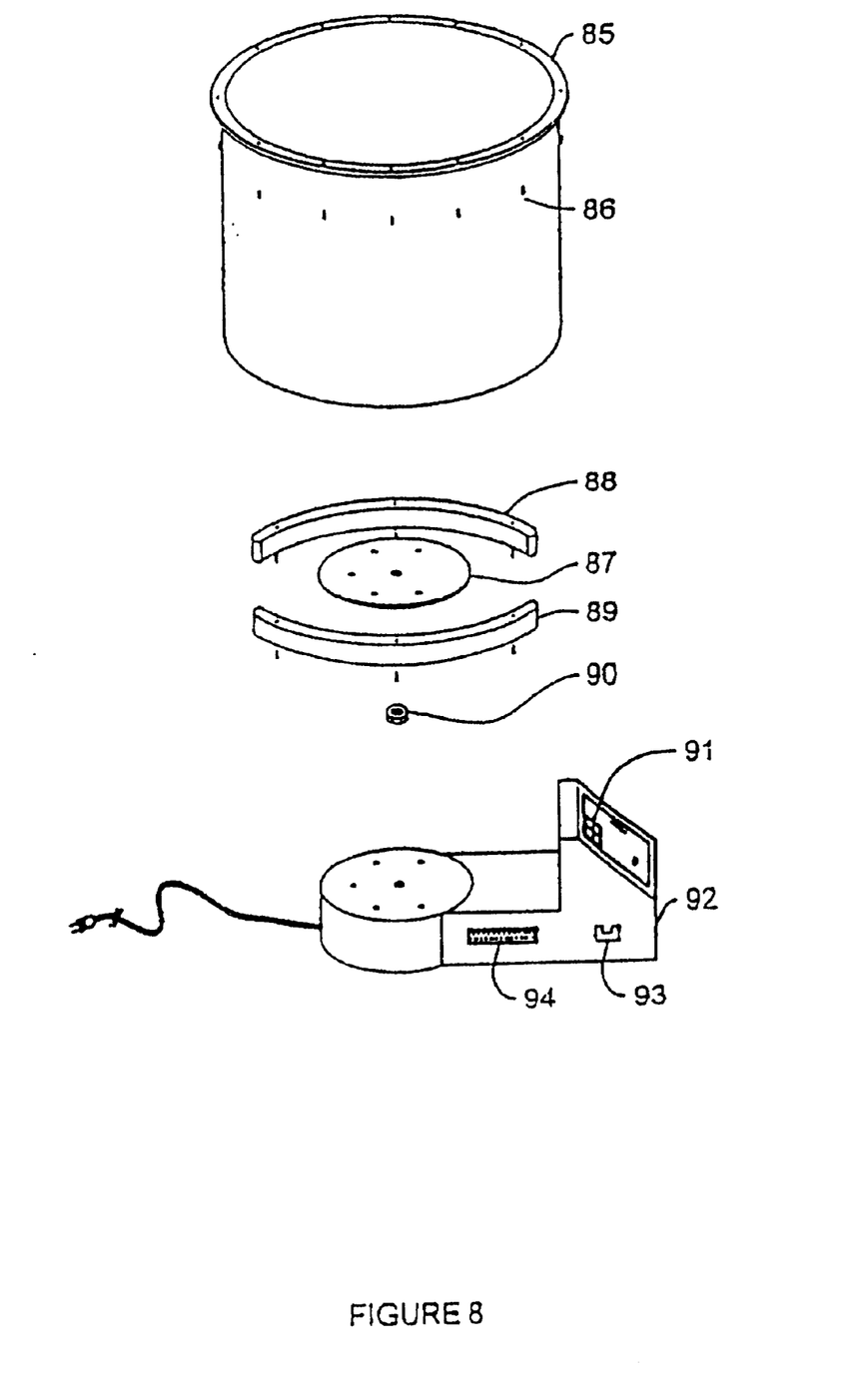
FIG. 8 is perspective view of the inner pot, base supports and housing for internal modem and electrical controls.

FIGS. 7 and 8 provide greater detail on parts and assembly of the novel pressure cooker. FIG. 7 shows a pot top (70) that contains a pressure valve (70a). The pot top (70) covers the pot rim (71) fitted with a silicon gasket (71a). A handle (73) is attached to the open pot rim by a pivot (74) at pivot connection point (75). A temperature sensor (76), with copper electrical wiring (77), is located on the side wall of the inner pot (72). A large stainless steel screw (78) connects the bottom of the inner pot (72) to the heating element (79), with prongs (80) that fit into a ceramic block (81) and are held in place by a stainless steel nut (82). The bottom sealing means consists of a silicon gasket (83) seated within a larger silicon gasket (84).

Figure 9:
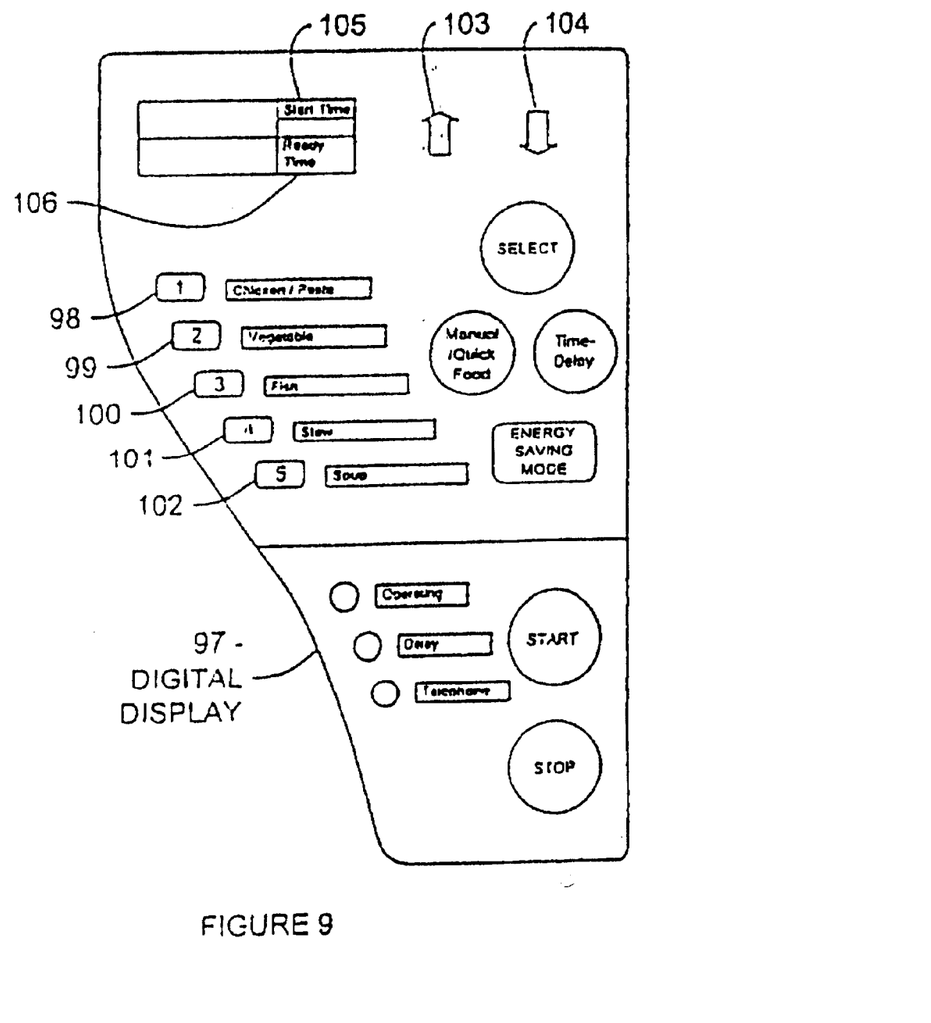
FIG. 9 is a diagram of the circuitry for the electrical control unit and the digital display control panel.

In FIG. 8, an inner pot (85) is attached to the pot rim with stainless steel screws (86) and subsequently mounted on a stainless steel pressure plate (87) seated within the tough, rigid plastic pieces that form the pot base (88, 89). This assembly is held together with more stainless steel screws and a stainless steel nut (90). At the bottom of the pot base (88,89) is a removably affixed timer (91) with liquid crystal display and a control casing (92) that houses microchips (not shown), a built-in modem (93), a serial port (94) for connecting a computer and circuitry that provides power and controls for heating and operating the pressure cooker FIG. 9 shows the wiring for a electronic control unit (190) which has separate wiring for the temperature sensor (191), a 120 volt–240 volt fiberglass printed circuit (PC) board (192) and the 120 volt–240 volt switch (193). The electronic control unit (190) is connected to a digital display unit (97). The digital display panel is explained in greater with an example that follows.

Figure 10:
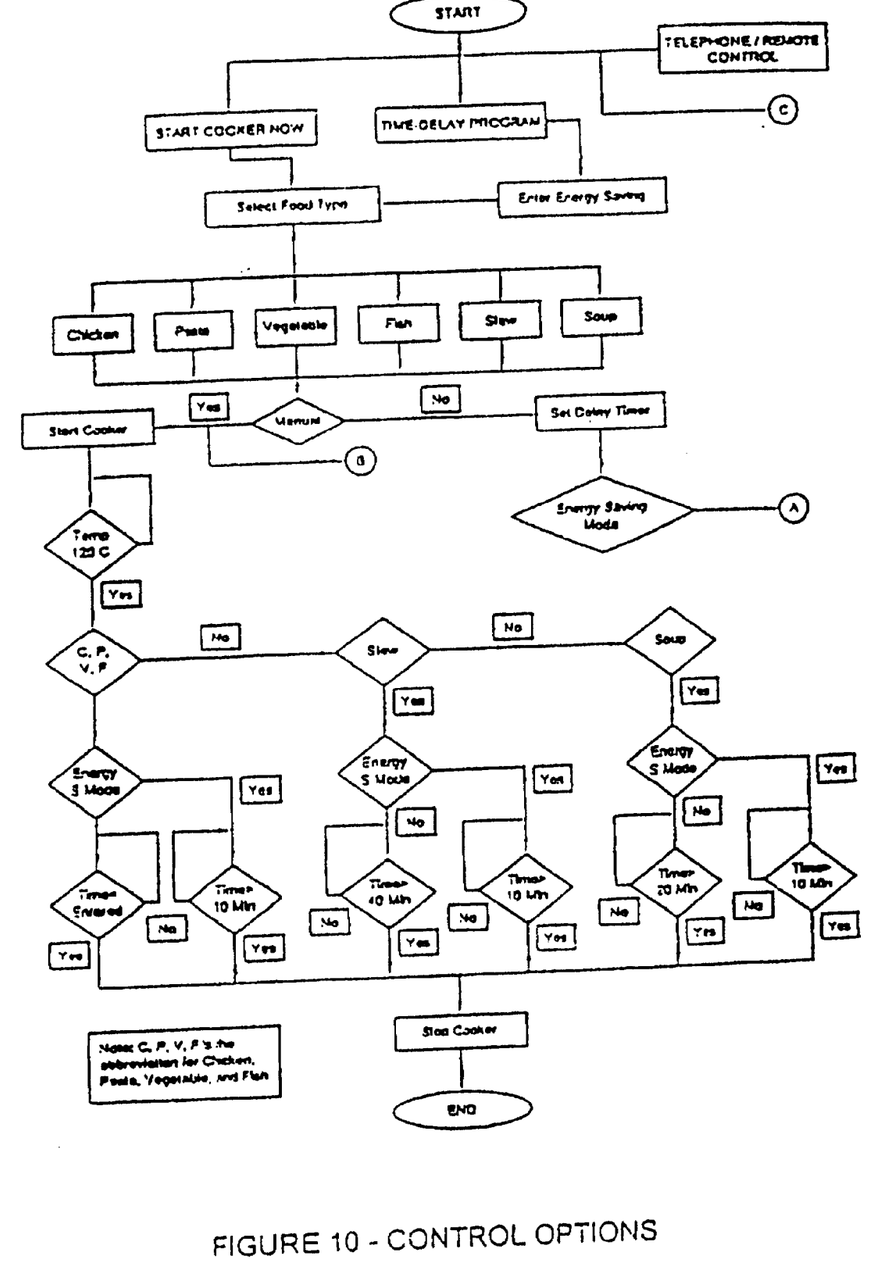
FIG. 10 is a flow diagram of various control options for the cooker.

In FIG. 10, a flow diagram shows how to operate the energy saving cooker either manually, on a time-delay program or by telephone remote control. In the manual operation, the user may select the quick food button and the cooker is started on demand. The food type is entered. Examples of the selections are Chicken. Pasta, Vegetable, Fish, Stew or Soup. The automatic cooker will cook the food according to the nature of the food: the length of time for cooking is preprogrammed in the cooker's computer chip. When using either the time-delay program or the telephone remote control, the user may delay the completion of cooking the foodstuff according to a predetermined schedule. Frozen food can be placed directly inside the pot; and the food will remain cold for an extended period, since the cooker is insulated. The user first determines when the foodstuff should be finished cooking. Then the Energy Saving Mode (ESM) is selected and the cooker will start automatically cooking at a time that is two and one-half hours plus the required cooking time for the selected food type, prior to the time the foodstuff is to be completely cooked. At the end of the Energy Saving Mode cycle, the "Keep-Warm" cycle will begin.

An example of the ESM operation is as follows, the time is now 8:00 AM, it is desirable for the foodstuff to be ready at 6:00 PM, a time that is 10 hours from now. Referring to FIG. 9, after selecting the food type (98, 99, 100, 101, or 102), the "Timer" is engaged (103 or 104) and the time for the cooker to start will appear in the display window. Start time (105) will equal 3:30 PM minus cooking time required for the food type selected. Thus, if the recommended cooking time is thirty (30) minutes, the Start Time (105) will be 3:30 PM minus the 30 minutes cooking time or 3:00 PM. Ready Time (106) equals 6:00 PM.

Figure 11:
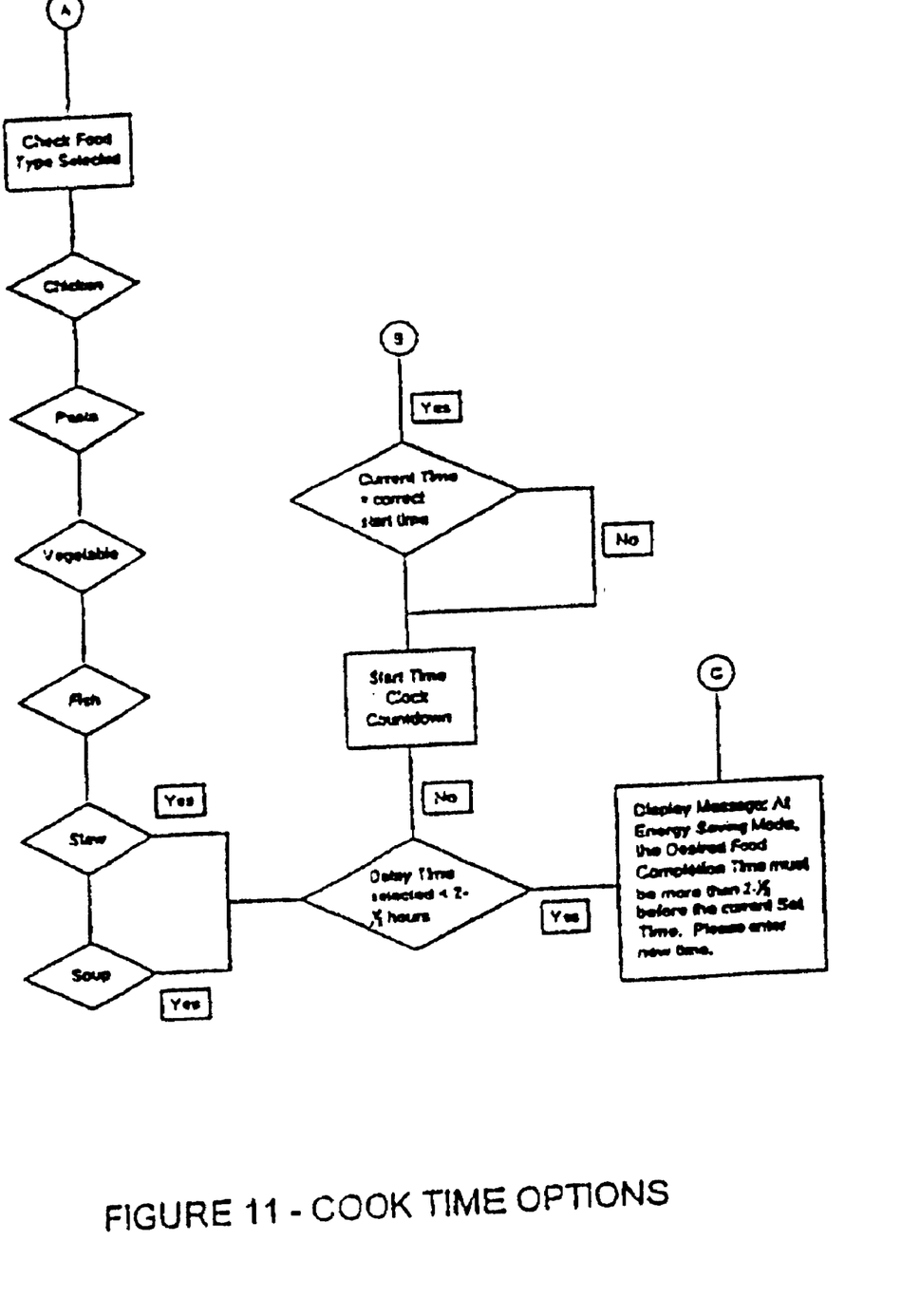
FIG. 11 is a flow diagram of various cook time options for the cooker.

FIG. 11 is a flow diagram of cook time options and continues the flow diagram in FIG. 10 with regard to decisions and actions to be taken if manual operation is chosen. Point A shows various food types having preprogrammed cook times. The user may select the food type for manual operation or use the ESM cycle. At point B the user decides when the food is to be ready and programs a time to start the cooker. At point C, when the energy saving mode (ESM) is selected and the desired completion time is less than 2½ hours, the cooker will ask user to re-enter new starting time.

Figure 12:
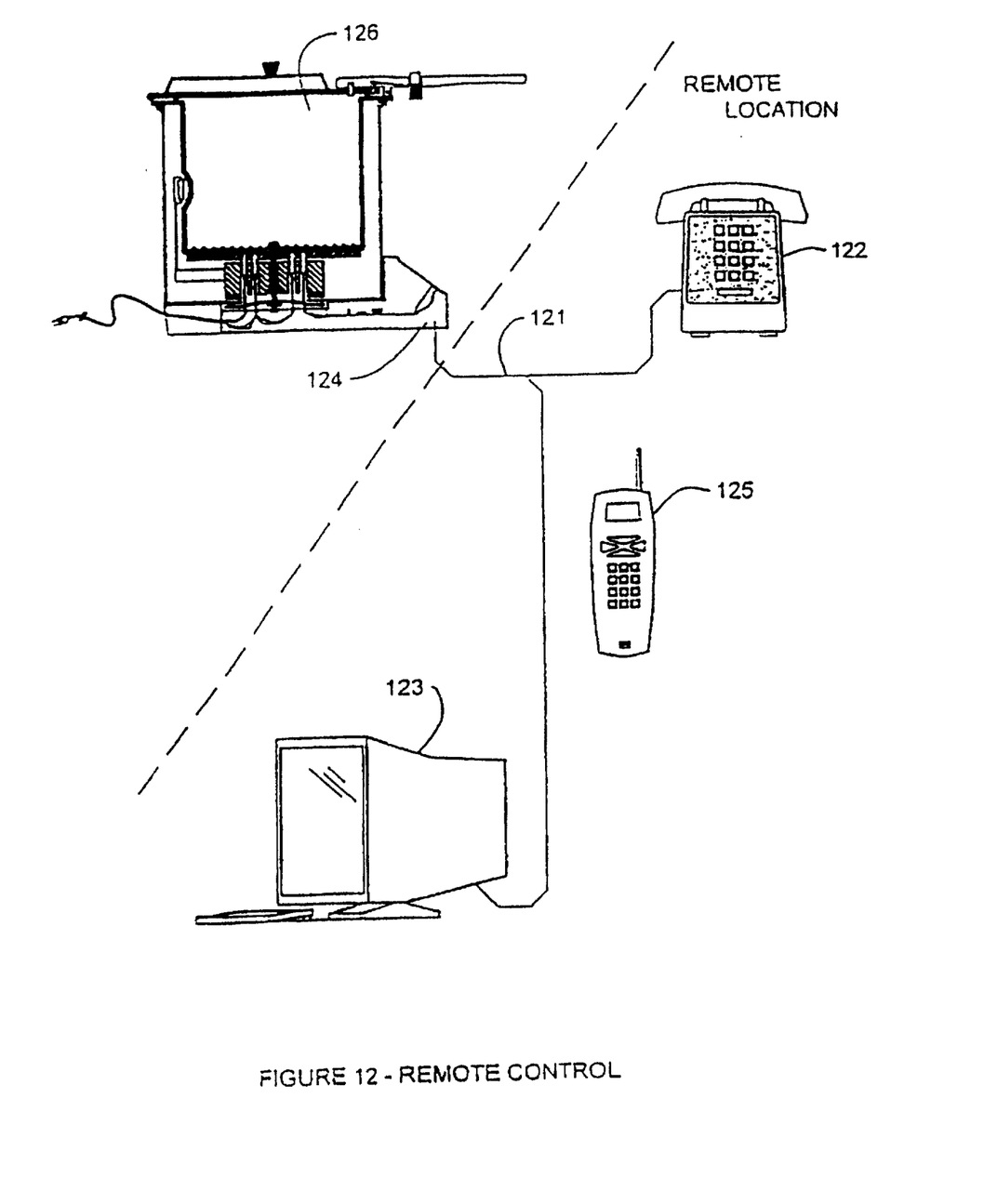
FIG. 12 is a diagram of the remote control operation of the energy saving cooker.

An example of the telephone remote control operation is illustrated in FIG. 12. An established communication line (121) such as, but not limited to the Internet, cable or telephone wiring is used from a remote location (122 or 123). The communication line (121) is plugged directly into the circuitry (124) containing ROM (Read-Only Memory) chips, which can distinguish different tones generated by pressing the telephone pad. The circuitry can be either RS232 or internal modem (124). Alternatively, a wireless, cellular telephone (125) may be used to operate the cooker, if different ones are generated by pressing the telephone pad. When the caller engages the circuitry by telephone, the modem interface will play a message:

1.1 "Welcome to the Automatic High Energy Saving Cooker." (126)
1.2 Please enter your Access Code or Password.
1.3 The current Start Time is 17:00 or 5:00 PM.
1.4 To change the current Start Time, please press "0."
1.5 To Quit and End this call, please press the pound (#) key.
1.6 To set a new Start Time, please enter the time and then press the pound (#) key.
1.7 Please enter the program selection:

| | |
|---|---|
| Chicken or Pasta | Press "1" |
| Vegetables | Press "2" |
| Fish | Press "3" |
| Stew | Press "4" |
| Soup | Press "5" |

1.7 Please press the Star (*) key to confirm
1.8 Press "0" to repeat this message.

1.9 Press the pound sign (#) to end.

The communication with and operation of the cooker can occur from remote locations including, but not limited to personal computers, such as an IBM compatible machine or a MacIntosh brand: a telephone, either wired or wireless, or a similar device capable of making a connection with the cooker's built-in modem. After the cooker has been engaged via a connection with the built-in modem, the process for operating the cooker is the same as outlined above. In addition, multiple language options can be programmed into the cooker by connecting the computer to the cooker's serial port (95) shown in FIG. 8.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of cooking in an energy conserving pressure cooker apparatus that receives edible foodstuff, comprising the steps of:

(a) providing an inner pressure cooking pot that is permanently housed within an inner wall of an insulated outer container;

(b) placing a liquid and foodstuff to be cooked into the inner cooking pot;

(c) sealing the inner pot and the outer container with a single cooking lid;

(d) setting a means for controlling to cause a heat generator to heat foodstuff in the inner cooking pot for a specified period of time, and to discontinue heating of the foodstuff at the expiration of said specified period of time;

(e) heating the liquid and ingredients in the inner pressure cooker pot with said heat generator;

(f) sensing when the liquid in the inner pressure cooker pot commences to boil with a thermal sensor;

(g) continuing to heat the liquid and foodstuff in said inner pressure cooker pot for said specific period of time;

(h) discontinuing heating of the foodstuff in said inner pressure cooker pot with said heat generator; and (i) adiabatically cooking the ingredients in the inner pressure cooker pot that is permanently disposed in an outer insulated container at a temperature achieved by heat retained the inner and outer containers, without additional heat being provided from said heat generator.

2. The method of claim 1, wherein step (f) further includes the steps of sensing the temperature of said inner pressure cooker pot, and measuring the period of elapsed time from said step of heating until the predetermined time for cooking the ingredients has elapsed, then discontinuing heating of the inner pressure cooker pot.

3. The method of claim 2, wherein the step of the measuring the period of elapsed time is by manual controls.

4. The method of claim 3, wherein the manual controls are used to define the time for heating in a range from approximately one minute to approximately 40 minutes.

5. The method of claim 2, wherein the temperature sensor is set to discontinue heating after a specific time when the temperature reaches approximately 120° C.

6. The method of claim 1, wherein the providing step (a) includes the step of insulating a space between the inner wall of the outer container and the pressure cooker pot.

7. The method of claim 6, wherein the insulating step includes the step of:

providing a vacuum in the insulating space.

8. The method of claim 6, wherein the insulating step includes the step of:

providing insulating materials in the insulating space.

9. The method of claim 1, further comprising the step of: regulating pressure in the inner pot with a pressure regulator valve.

10. The method of claim 1, further comprising the step of: sealing the lid to the inner pot with a lock.

11. The method of claim 1, further comprising the step of:

remotely controlling the heating of the foodstuffs in the cooker apparatus by at least one of: a telephone and a computer.

* * * * *